United States Patent [19]

Orris et al.

[11] 4,056,747
[45] Nov. 1, 1977

[54] SPEED SENSOR

[75] Inventors: Stephen Jay Orris, Allen Park; Frederick Otto Richard Miesterfeld, Troy, both of Mich.

[73] Assignee: Chrysler Corporation, Highland Park, Mich.

[21] Appl. No.: 651,385

[22] Filed: Jan. 22, 1976

[51] Int. Cl.² ............................................. H02K 21/38
[52] U.S. Cl. ..................................... 310/155; 310/168
[58] Field of Search ............... 310/155, 168; 324/174; 188/181 R

[56] References Cited

U.S. PATENT DOCUMENTS

| | | | |
|---|---|---|---|
| 2,541,422 | 2/1951 | Kirkland et al. | 310/168 X |
| 2,740,110 | 3/1956 | Trimble | 310/168 X |
| 3,158,033 | 11/1964 | Cohen | 310/155 X |
| 3,317,765 | 5/1967 | Cone | 310/168 X |
| 3,619,680 | 11/1971 | Okamoto | 310/168 |
| 3,676,765 | 7/1972 | Westcott | 324/174 X |
| 3,703,946 | 11/1972 | Ondrasik | 188/181 R |
| 3,719,841 | 3/1973 | Ritsema | 310/155 |
| 3,769,533 | 10/1973 | Pauwels | 310/155 |
| 3,912,958 | 10/1975 | Steen | 310/168 |
| 3,971,995 | 7/1976 | Eikelberger | 328/149 |

Primary Examiner—Donovan F. Duggan
Attorney, Agent, or Firm—Baldwin & Newtson

[57] ABSTRACT

A speed sensor comprises a pick-up device mounted on the aluminum casing of a vehicle transmission, adjacent an existing ferromagnetic gear inside the transmission casing, which gear rotates in unison with the driven wheels of the vehicle. The pick-up device comprises a permanent magnet and a toroidal ferromagnetic core on which an inductive coil is wound. The permanent magnet and toroidal core are cooperatively arranged with respect to the ferromagnetic gear such that a magnetic circuit is created from the permanent magnet through the toroidal core, through the transmission casing, and through the ferromagnetic transmission gear back through the transmission casing to the permanent magnet. As the gear rotates, the reluctance of the magnetic circuit is varied at a rate representative of the speed of the gear and hence the speed of the vehicle. The speed information is provided across the inductive coil. When the pick-up is utilized with a resonant detector circuit, a capacitor connected across the coil forms a resonant circuit whose resonant frequency is modulated by the rotating gear.

20 Claims, 2 Drawing Figures

U.S. Patent    Nov. 1, 1977    4,056,747
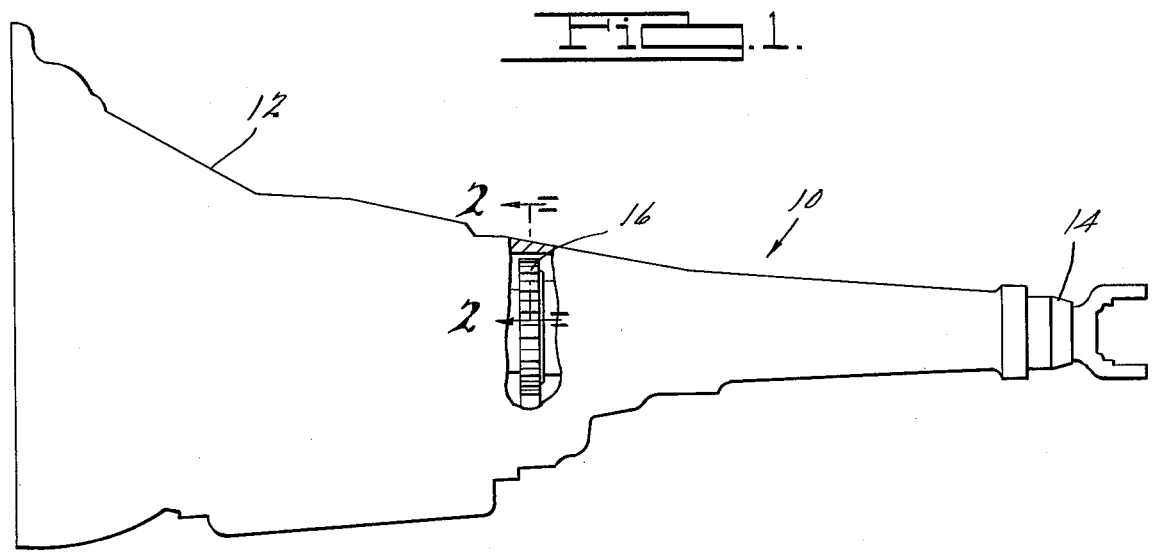
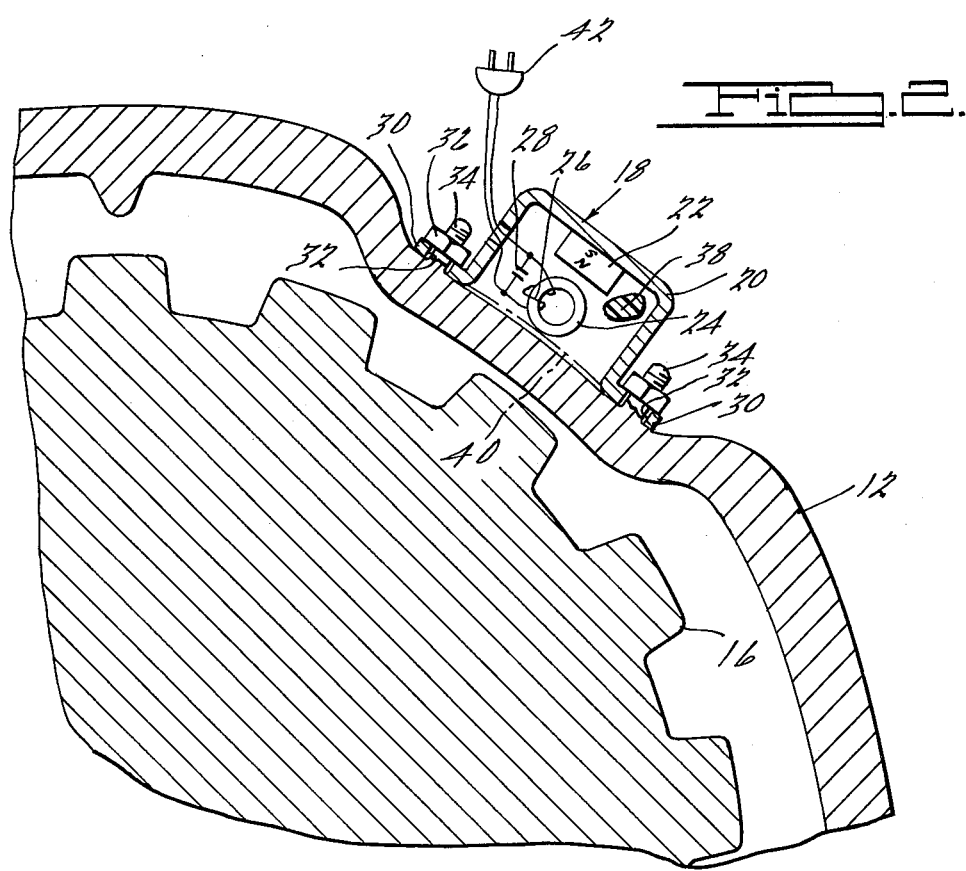

SPEED SENSOR

BACKGROUND AND SUMMARY OF THE INVENTION

This invention relates to speed sensing devices and is particularly concerned with a novel speed sensor especially useful for an automotive vehicle.

Speedometer systems currently in use in automotive vehicles are generally mechanical type systems wherein speed information is generated by a speedometer gear in the transmission. The speedometer gear is operatively coupled with the vehicle speedometer via a speedometer cable assembly. In anti-skid braking systems and speed control systems utilized in automotive vehicles, speed information is generated electrically via various types of electromagnetic pick-up devices.

The present invention is concerned with a novel electromagnetic pick-up device which itself has no moving parts but rather is utilized in conjunction with the existing transmission to provide an electrical speed signal representative of vehicle speed. A pick-up device embodying principles of the present invention results is simpler construction, convenient mounting on the vehicle, ruggedness in use and reliability, all while generating accurate speed information. The invention arises in part through the recognition that the aluminum casing of a transmission has no influence on a magnetic circuit passing through the casing and through the recognition of the availability of a toothed ferromagnetic gear which rotates adjacent the casing and is directly operatively coupled via the driveshaft and axle with the rear wheels of the vehicle.

The foregoing features, advantages and benefits of the present invention will be seen in the ensuing description and claims which are to be considered in conjunction with the accompanying drawing wherein there is illustrated a presently preferred embodiment of the invention according to the best mode presently contemplated in carrying out the invention.

BRIEF DESCRIPTION OF THE DRAWING

FIG. 1 is a side elevational view, having a portion broken away, of a vehicle transmission embodying a speed sensor according to principles of the present invention.

FIG. 2 is an enlarged fragmentary sectional view taken in the direction of arrows 2-2 in FIG. 1.

CROSS REFERENCE TO A RELATED APPLICATION

Reference is made to the application of Frederick O. R. Miesterfeld entitled "Resonant Sensor Using a Phase Locked Loop Detector" filed of even date herewith having Ser. No. 651,384 and assigned to the same assignee as the present application.

DESCRIPTION OF THE PREFERRED EMBODIMENT

In the drawing an existing vehicle transmission 10 comprises an aluminum casing 12, an output shaft 14, and a ferromagnetic gear 16. In accordance with principles of the present invention there is mounted on casing 12 an electromagnetic pick-up device 18. Pick-up device 18 comprises a housing 20, a permanent magnet 22, a toroidal ferromagnetic core 24, an inductive coil 26 formed of insulated conductor wire wound on core 24 and a capacitor 28.

Housing 20 is made from any suitable material, for example steel, and is generally in the shape of a rectangular container having one side thereof open. A pair of projecting tabs 30 are turned outwardly from the opposite side edges of housing 20 adjacent the opening therein and are provided with suitable holes 32 extending therethrough to provide for attachment of housing 20 to casing 12. The attachment is made by providing on casing 12 a pair of projecting studs 34 which are adapted to register with holes 32. The pick-up device is positioned on casing 12 with projecting studs 34 passing through holes 32 and attaching nuts 36 are threaded onto studs 34 and against the tabs 30 to hold the pick-up device securely in place. Although this particular attachment arrangement is merely exemplary, it is particularly advantageous in that the projecting studs 34 may be cast integrally with casing 12 as unthreaded studs and the nuts 36 may have the capability of cutting the thread on the studs during attachment.

Preferably, magnet 22, core 24, coil 26 and capacitor 28 are encased by means of a suitable potting material 38 which fills the interior of housing 20 to a desired fill level, illustratively shown at 40.

According to principles of the present invention, a magnetic circuit is provided from pick-up device 18 through casing 12 to gear 16 and returning from gear 16 back through casing 12 to the pick-up device. By locating the pick-up device in proximity to the periphery of gear 16, the reluctance of the magnetic circuit path is a function of the rotation of gear 16.

The magneto-motive force for the magnetic circuit is provided by permanent magnet 22. In the illustrated embodiment the south magnetic pole of magnet 22 is in contact with housing 20 while core 24 is disposed in immediate juxtaposition to the north magnetic pole of magnet 22 with its axis perpendicular to the flux emanating from the north magnetic pole. The magnetic circuit extends from the north magnetic pole of magnet 22 through core 24, through casing 12 to gear 16, and returns to the south magnetic pole of magnet 22 through casing 12, and also through housing 20 when the latter is made of a ferromagnetic material, such as in the example. Dimensional details for a given device may be specified by using conventional engineering formulas and calculations. Because the magnetic circuit intercepts the periphery of gear 16, rotation of the gear causes the reluctance of the magnetic circuit to vary as a function of rotation of the gear. Because coil 26 is electromagnetically coupled with the magnetic circuit, the effective inductance of the coil becomes a function of rotation of gear 16, and a speed signal containing speed information relative to the speed of the gear can be obtained across the coil. This signal can be utilized in providing a speed indication to a driver of the vehicle or for other purposes if desired. The end segments of coil 26 are brought out through an opening in the side wall of housing 20 to terminate in a connector plug 42 which can be connected to a suitable circuit for processing the speed information.

While a number of possible circuits may be utilized for this purpose, the phase locked loop detector circuit disclosed and claimed in the above cross-referenced patent application is especially well-suited for use with the disclosed sensor. The circuit of that patent application utilizes coil 26 in a resonant tank circuit formed by the parallel combination of coil 26 and capacitor 28. As the inductance of coil 26 changes, the resonant frequency of this tank circuit similarly changes so that the speed information is contained in the resonant frequency of the circuit. By monitoring for changes in resonant frequency of the tank circuit, noise rejection is greatly improved.

In an automotive vehicle the transmission 10 has the output shaft 14 driving the rear wheels through a driveshaft and axle. Gear 16 is the parking sprag which is operatively coupled with output shaft 14 to rotate in unison therewith irrespective of the position of the transmission gear selector. Thus, pick-up 18 can generate a speed signal which is always indicative of the speed of the rear wheels and hence the speed of the vehicle.

From the foregoing description and accompanying drawing, pick-up device 18 is seen to comprise only a small number of parts, and non-moving ones at that, because the existing ferromagnetic gear 16 is capable of providing a variable reluctance path and casing 12, being of aluminum, is non-ferromagnetic and hence permits the magnetic flux to freely pass from the externally mounted pick-up device 18, through the casing, to the ferromagnetic gear 16. Moreover, the pick-up device is of relatively compact size which is desirable for packaging. One reason that the pick-up device can be made this small is because toroidal ferromagnetic core 24 with coil 26 wound thereon yields a sufficiently large inductance with a relatively few number of turns required for coil 26. Thus the size of coil 26 and core 24 can be quite small. By encasing the internal components within the potting material 38 in housing 20, the device is quite rugged and can be mounted externally of the transmission where it is exposed to the adverse elements frequently encountered by an automobile transmission. The illustrated technique for mounting the pick-up device on the transmission casing further contributes to the simplicity and ease of installation of the device. In constructing a pick-up device according to the invention, toroidal core 24 can be oriented with its axis rotated 90° from the position shown in FIG. 2 but still perpendicular to the magnetic flux path from magnet 22 to gear 36; such a construction may be preferred, for example, where more sensitivity is desired or where the teeth of the transmission gear have smaller individual circumferential thicknesses.

What is claimed is:

1. In a system for providing a speed signal the combination comprising:
    a toothed ferromagnetic reluctor member contained interiorly of a casing, said casing having an imperforate non-ferromagnetic wall portion and said ferromagnetic reluctor member being disposed such that teeth thereof confront said imperforate non-ferromagnetic wall portion;
    an electromagnetic speed pick-up device disposed exteriorly of said casing and confronting said imperforate non-ferromagnetic wall portion, said device including a magnetic flux source creating a magnetic circuit which exits said device and enters said casing via said imperforate non-ferromagnetic wall portion, passes through said toothed ferromagnetic member, and exits said casing and re-enters said device via said imperforate non-ferromagnetic wall portion, said device comprising an inductance coil electromagnetically coupled with said magnetic circuit;
    and means for moving said toothed ferromagentic reluctor member relative to said casing such that teeth of said member move past said imperforate non-ferromagnetic wall portion and cause a speed siganl representative of the speed of movement of said member to be provided by said coil.

2. The combination claimed in claim 1 wherein said device comprises a housing mounted on the exterior of said imperforate non-ferromagnetic wall portion said magnetic flux source and said coil being contained within said housing.

3. The combination claimed in claim 1 wherein said magnetic flux source comprises a permanent magnet.

4. The combination claimed in claim 1 wherein said reluctor member is mounted within said casing for rotation about a fixed axis.

5. The combination claimed in claim 1 wherein said device includes a toroidal ferromagnetic core member disposed in said magnetic circuit, said coil being inductively disposed on said toroidal ferromagnetic core member.

6. The combination claimed in claim 5 wherein said toroidal core member is disposed such that the axis thereof is perpendicular to the direction of magnetic flux in said circuit.

7. The combination claimed in claim 5 wherein said pick-up device mounts directly on said imperforate non-ferromagnetic wall portion.

8. The combination claimed in claim 7 wherein said magnetic flux source, toroidal ferromagnetic core member and coil are encased in a potting material within a housing mounted directly on said imperforate non-ferromagnetic wall portion.

9. The combination claimed in claim 1 wherein said device includes capacitor means connected across said coil.

10. The combination claimed in claim 1 wherein said casing comprises the transmission housing of a vehicle transmission and said reluctor member comprises a gear within said housing.

11. A speed sensor for sensing speed of a toothed ferromagnetic reluctor member comprising in combination with said reluctor member an electromagnetic pick-up device disposed in relation to said reluctor member such that teeth of said reluctor member move past said device upon movement of said reluctor member relative to said device, said pick-up device comprising:
    a magnetic flux source creating a magnetic circuit extending from said device through said reluctor member and returning to said device;
    a toroidal ferromagnetic core member disposed in said magnetic circuit;
    an inductance coil inductively disposed on said toroidal ferromagnetic coil member;
    and a capacitor electrically connected across said inductance coil.

12. A speed sensor as claimed in claim 11 wherein said pick-up device comprises a housing within which are contained said toroidal ferromagnetic core member, said inductance coil, said magnetic flux source and said capacitor.

13. A speed sensor as claimed in claim 12 wherein said magnetic flux source, said toroidal ferromagnetic core member, said inductance coil, and said capacitor are encased in a potting material within said housing.

14. A speed sensor as claimed in claim 12 wherein only two lead wires exit from said housing to provide for connection of said pick-up device in an electric circuit.

15. A speed sensor as claimed in claim 11 wherein said toothed ferromagnetic reluctor member is arranged for rotary movement.

16. In combination:
a non-ferromagnetic casing;
a rotary ferromagnetic reluctor member within said casing providing a variable reluctance;
an electromagnetic pick-up device comprising a housing disposed on the outside of said casing in juxtaposition to said reluctor member such that the device is magnetically coupled with said reluctor member;
said housing comprising a mounting tab having an opening therein;
said casing having an integral projecting stud on the outside thereof extending through said opening;
and a fastener on said stud over said tab.

17. A speed pick-up device adapted for use with a movable toothed ferromagnetic reluctor member for sensing speed thereof, said pick-up device comprising:
a housing;
a toroidal ferromagnetic core member disposed within said housing;
an inductance coil inductively disposed on said toroidal core member within said housing;
a magnetic flux source disposed within said housing;
a capacitor disposed within said housing and electrically connected across said inductance coil;
said magnetic flux source, said toroidal ferromagnetic core member and said inductance coil being arranged within said housing to form a magnetic circuit which when said pick-up device is used with a movable toothed ferromagnetic reluctor member has the circuit reluctance varied by movement of said ferromagnetic reluctor member whereby the resonant frequency of said inductance coil and said capacitor is modulated;
and means via which said inductance coil and said capacitor may be connected in an electrical circuit which is located exteriorly of said housing.

18. A speed pick-device as claimed in claim 17 wherein said magnetic flux source comprises a permanent magnet.

19. A speed pick-up device as claimed in claim 17 wherein said magnetic flux source, said toroidal ferromagnetic core member, said inductance coil, and said capacitor are encased in a potting material within said housing.

20. A speed pick-up device as claimed in claim 17 wherein said housing is of ferromagnetic material and said magnetic flux source is disposed against a wall of said housing so that the housing becomes part of said magnetic circuit.

* * * * *